(12) United States Patent
Chen

(10) Patent No.: US 7,638,778 B2
(45) Date of Patent: Dec. 29, 2009

(54) ULTRAVIOLET RAY STERILIZATION DEVICE

(76) Inventor: Mei-Lan Chen, No. 25, Lane 77, Fuguo Rd., Yongkang City, Tainan County (TW)

(*) Notice: Subject to any disclaimer, the term of this patent is extended or adjusted under 35 U.S.C. 154(b) by 140 days.

(21) Appl. No.: 12/073,820

(22) Filed: Mar. 11, 2008

(65) Prior Publication Data

US 2009/0230321 A1  Sep. 17, 2009

(51) Int. Cl.
*A61L 2/10* (2006.01)
*C02F 1/32* (2006.01)
*B01D 35/06* (2006.01)

(52) U.S. Cl. ............... 250/455.11; 250/436; 250/461.1; 210/205; 210/748; 422/186.3

(58) Field of Classification Search ............ 250/432 R, 250/436, 437, 455.11, 461.1, 504 R; 210/205, 210/748; 422/186.3
See application file for complete search history.

(56) References Cited

U.S. PATENT DOCUMENTS

| 2003/0052278 A1* | 3/2003 | Duarte | 250/438 |
|---|---|---|---|
| 2004/0004044 A1* | 1/2004 | Anderson | 210/748 |
| 2005/0212626 A1* | 9/2005 | Takamatsu | 333/212 |
| 2006/0045796 A1* | 3/2006 | Anderle et al. | 422/3 |
| 2007/0241288 A1* | 10/2007 | Wang | 250/436 |
| 2008/0203004 A1* | 8/2008 | Abe et al. | 210/205 |
| 2009/0084734 A1* | 4/2009 | Yencho | 210/741 |
| 2009/0145855 A1* | 6/2009 | Day et al. | 210/748 |
| 2009/0230321 A1* | 9/2009 | Chen | 250/455.11 |

\* cited by examiner

*Primary Examiner*—Bernard E Souw
(74) *Attorney, Agent, or Firm*—Rosenberg, Klein & Lee

(57) ABSTRACT

A sterilization device includes a shell, an ultraviolet ray lamp tube fixed with a lamp support on an upper end of the shell, an inner quartz tube around the lamp tube, an outer quartz tube around the inner quartz tube, a stainless steel tube around the outer quartz tube, an inner passage between the inner and the outer quartz tubes, an outer passage between the outer quartz tube and the stainless steel tube, and a guiding member on the lower end of the shell; the guiding member has guiding holes to guide water along a spiral path, and a water inlet on a lower portion thereof, which communicates with the guiding holes; a covering member is threadedly engaged with an outer side of the lower end of the shell; the water inlet of the guiding member extends through the covering member; the covering member has a water outlet hole.

4 Claims, 5 Drawing Sheets

ULTRAVIOLET RAY STERILIZATION DEVICE

BACKGROUND OF THE INVENTION

1. Field of the Invention

The present invention relates to an ultraviolet ray sterilization device, more particularly one, which allows water to be exposed to ultraviolet ray for longer time so that water can be thoroughly sterilized, and which is structured in such a manner that the various internal components such as the ultraviolet ray lamp tube can be replaced relatively easily.

2. Brief Description of the Prior Art

People can use water filters to remove dangerous contaminants owing to the increasing concern over the quality and safety of tap water, which is nevertheless the more economical choice if one is only choosing between tap water and bottled water. And, water filters are getting popular because more people have begun to realize that drinking filtered water is a much more economical practiced than drinking bottled water, and pure water product of water filters can be cleaner and safer to drink than bottled water.

An ultraviolet ray sterilization device can be connected to a water filter to kill germ and microorganism in water passed through the filter so that water is even safer to drink. A common ultraviolet ray sterilization device consists of a sealed stainless steel tube, a quartz tube held in the stainless steel tube, and an ultraviolet ray lamp tube held in the quartz tube. When water is passed through the space between the quartz tube and the stainless steel tube from an inlet on one end of the sterilization device, it will be exposed to ultraviolet ray to be sterilized. Next, the sterilized water will flow out through an outlet on the other end of the ultraviolet ray sterilization device.

The above ultraviolet ray sterilization device is found to have the following drawbacks:

1. Water will travel from the inlet to the outlet along a substantially straight path. In other words, the length of time water is exposed to ultraviolet ray in the stainless tube of the sterilization device totally depends on the length of the ultraviolet ray lamp tube. If the ultraviolet ray lamp tube is short, water can't be sufficiently sterilized with the sterilization device.

2. The stainless steel tube is sealed up, and can't be easily opened. Therefore it is difficult for the user to replace the quartz tube and the ultraviolet ray lamp tube after they have been used for a certain amount of time.

Therefore, it is a main object of the present invention to provide an improvement on an ultraviolet ray sterilization device to overcome the above problems.

SUMMARY OF THE INVENTION

An ultraviolet ray sterilization device according to an embodiment of the present invention includes a shell, an ultraviolet ray lamp tube fixed with a lamp support fitted on an upper end of the shell, an inner quartz tube around the lamp tube, an outer quartz tube around the inner quartz tube, a stainless steel tube around the outer quartz tube, and a spiral guiding member on the lower end of the shell; an inner water passage is formed between the inner and the outer quartz tubes, and an outer water passage is formed between the outer quartz tube and the stainless steel tube. The guiding member has guiding holes to guide water along a spiral path. A covering member is threadedly engaged with an outer side of the lower end of the shell, and has a water outlet hole. The guiding member has a water inlet, which communicates with the guiding holes, and extends through the covering member. Therefore, it takes more time for water to flow through the present device, and water will be exposed to ultraviolet ray for longer time to be thoroughly sterilized. And, the lamp support and the covering member can be easily separated from the shell for allowing replacement of the internal components of the present sterilization device.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
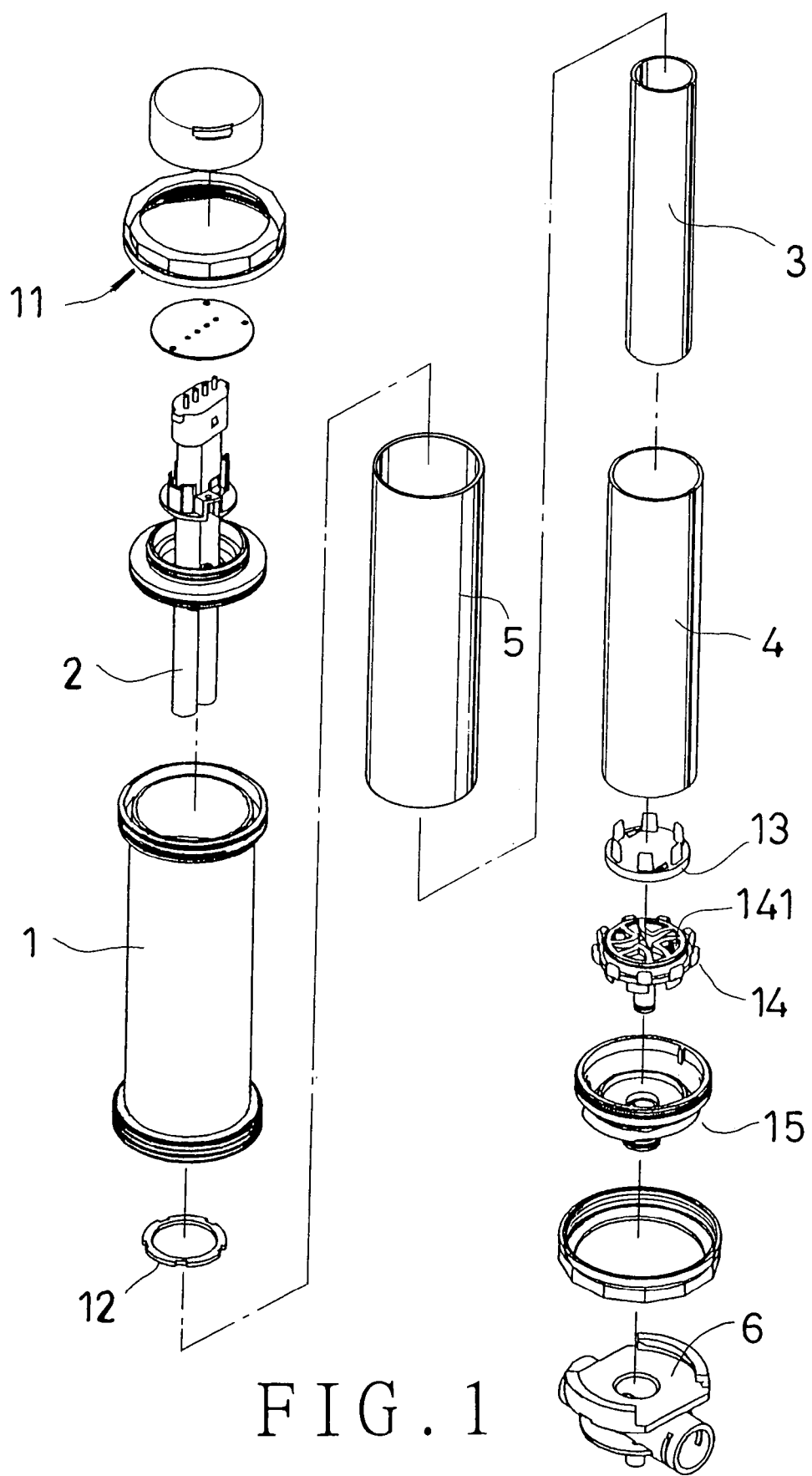
FIG. 1 is an exploded perspective view of the present invention.

Referring to FIG. 1, a preferred embodiment of an ultraviolet ray sterilization device of the present invention consists of a shell 1, an ultraviolet ray lamp tube 2, an inner quartz tube 3, an outer quartz tube 4, a stainless steel tube 5, and a base 6.

Figure 2:
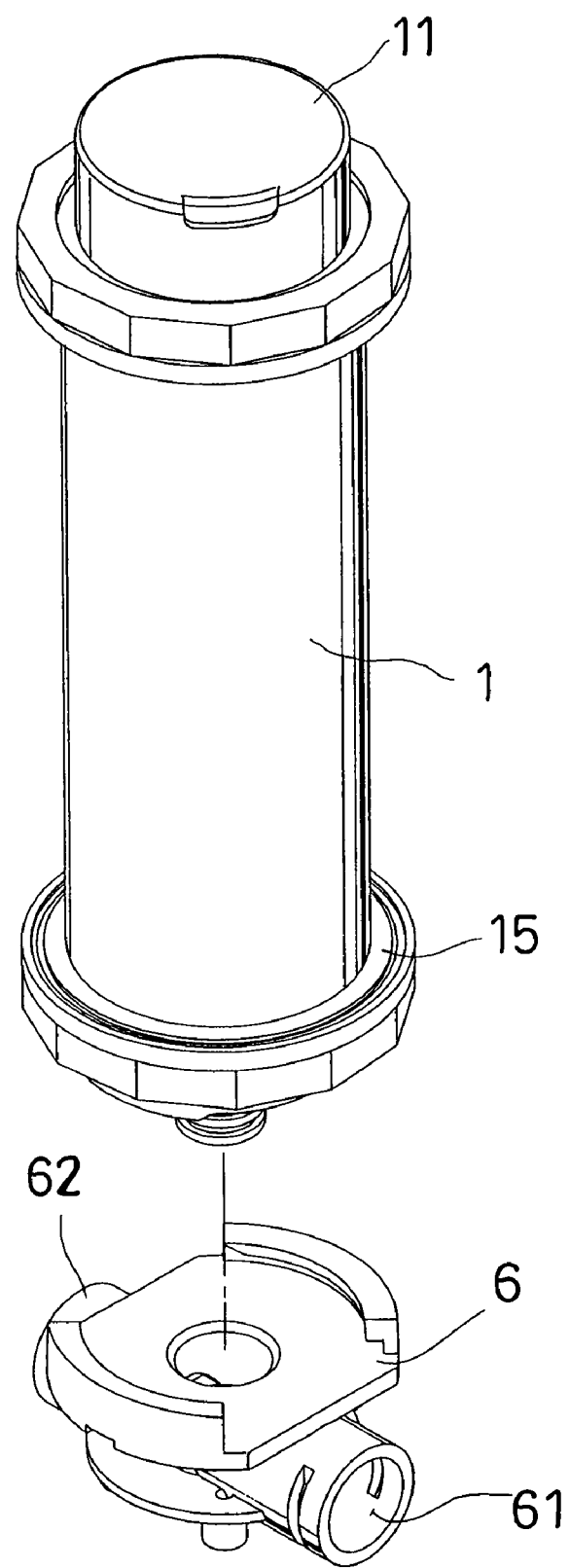
FIG. 2 is a perspective view of the present invention.
Figure 3:
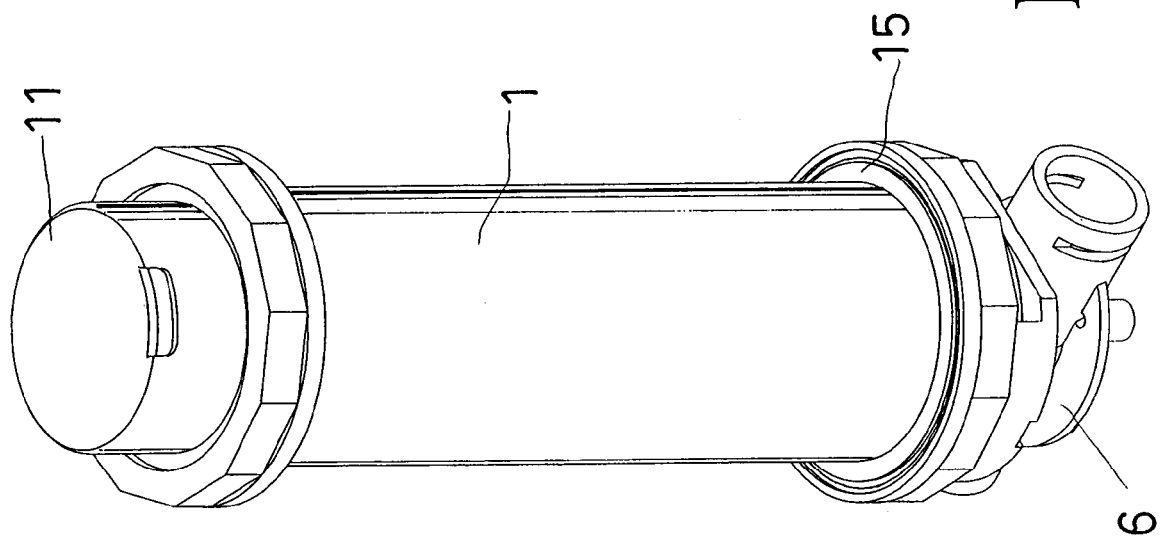
FIG. 3 is another perspective view of the present invention.
Figure 4:
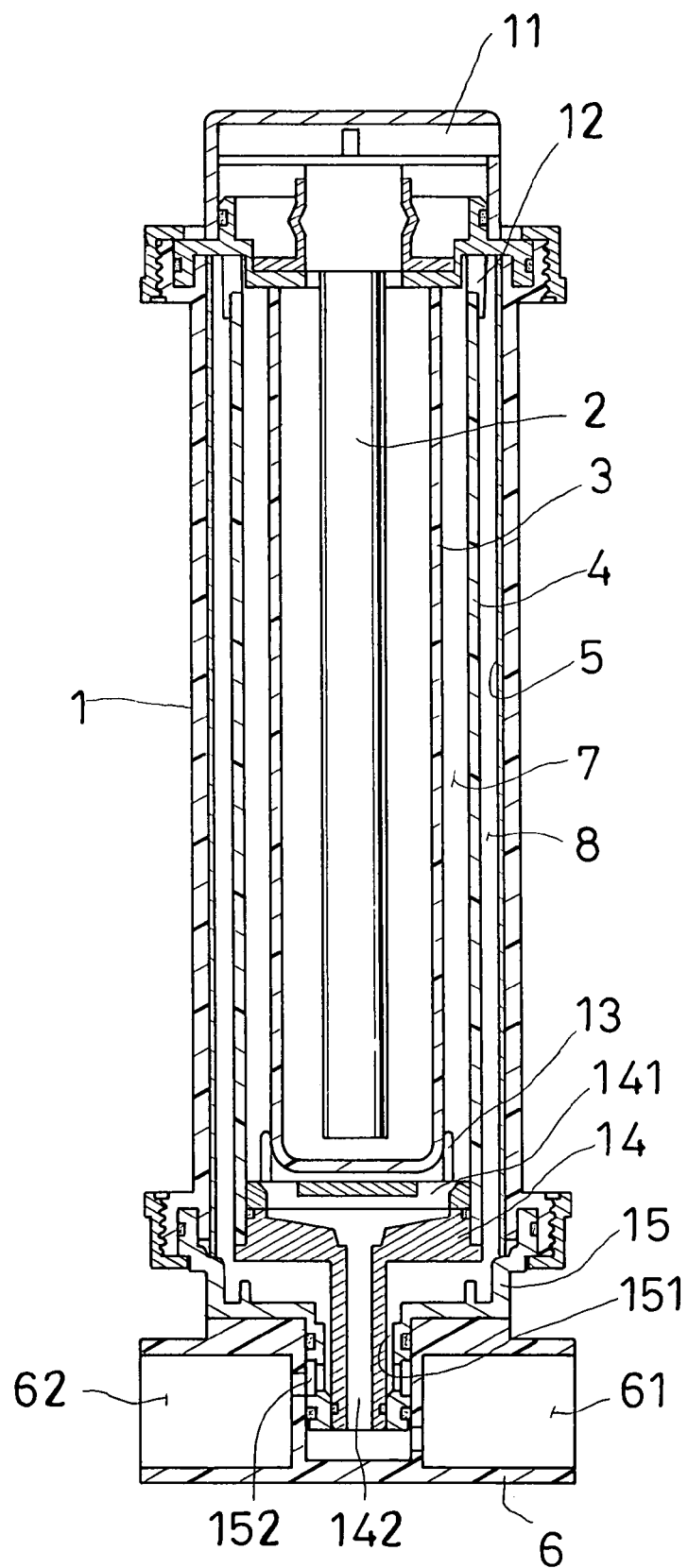
FIG. 4 is a sectional view of the present invention.

Referring to FIG. 2 to FIG. 4 as well, the shell 1 has a lamp support 11 threadedly engaged with an upper end thereof. The ultraviolet ray lamp tube 2 is held in the shell 1, and joined on the lamp support 11 so that power can be supplied to the ultraviolet ray lamp tube 2 through the lamp support 11. The ultraviolet ray lamp tube 2 can be a double-barreled one.

The inner quartz tube 3 is positioned around the ultraviolet ray lamp tube 2 in the shell 1, and it contacts a bottom side of the lamp support 11 at an upper end thereof. Furthermore, a lower fixing member 13 is joined on a lower end of the shell 1, and the inner quartz tube 3 is propped on and held in position with the lower fixing member 13 at a lower end thereof.

The outer quartz tube 4 is positioned around the inner quartz tube 2 in the shell 1 so that an inner water passage 7 is formed between the inner and the outer quartz tubes 3 and 4. In addition, an upper fixing member 12 is joined on a bottom side of the lamp support 11, and the outer quartz tube 4 is fixedly positioned around the upper fixing member 12 at an upper portion thereof.

The stainless steel tube 5 is positioned around the outer quartz tube 4 in the shell 1 so that an outer water passage 8 is formed between the outer quartz tube 4 and the stainless steel tube 5.

Furthermore, a spiral guiding member 14 is arranged under the lower fixing member 13, and secured on the lower end of the shell 1. The spiral guiding member 14 has several guiding holes 141 to guide water along a spiral path. The spiral guiding member 14 has a water inlet on a lower portion thereof, which is in open communication with the guiding holes 141. And, the outer quartz tube 4 is fixedly positioned around a circumference of the spiral guiding member 14 at a lower portion thereof.

A covering member 15 is positioned around and threadedly engaged with an outer side of the lower end of the shell 1. The covering member 15 has a through hole 151 on a lower portion thereof while the water inlet 142 of the spiral guiding member 14 extends through thee through hole 151 of the covering member 15. The covering member 15 has a water outlet hole 152 on a lateral side of the lower portion thereof.

The base 6 is joined on the lower portion of the covering member 15, and has a water inlet hole 61, which is in open communication with the water inlet 142 of the spiral guiding member 14. Moreover, the base 6 has a water outlet hole 62 communicating with the water outlet hole 152 of the covering member 15.

Figure 5:
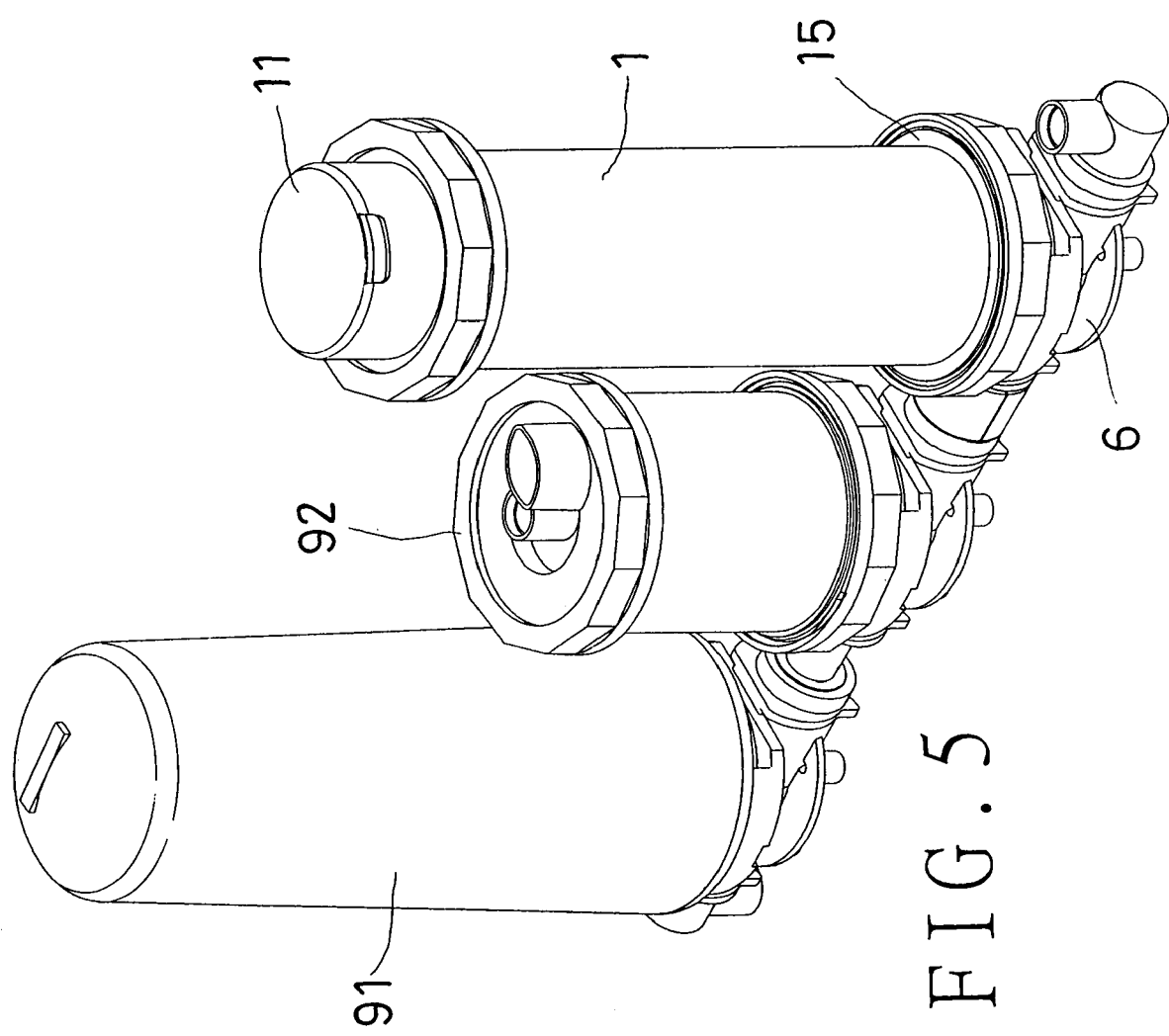
FIG. 5 is a perspective view of the present invention connected with a filter and an electrolytic device for use.

Referring to FIG. 5, the ultraviolet ray sterilization device can be connected to a filter 91, and an electrolytic device 92 to purify water; water is made to flow through the filter 91 and the electrolytic device 92 so that the water is filtered and electrolyzed. Next, the water will flow into the ultraviolet ray sterilization device through the water inlet hole 142 of the spiral guiding member 14, which extends through the water inlet hole 61 of the base 6; water will be made to flow along a spiral path owing to the guiding hole 141 of the spiral guiding member 14. Next, water will flow through the inner water passage 7 between the inner and the outer quartz tubes 3 and 4, and the outer water passage 8 between the outer quartz tube 4 and the stainless steel tube 5. Thus, ultraviolet ray emitted from the ultraviolet ray lamp tube 2 will travel through the inner and the outer quartz tubes 3 and 4, and will be reflected by the stainless steel tube 5 so as to sterilize water flowing through the inner and the outer water passages 7 and 8. Finally, purified water will flow out of the ultraviolet ray sterilization device through the water outlet hole 152 of the covering member 15 and the water outlet hole 62 of the base 6.

From the above description, it can be seen that the present invention has the following advantages over the prior art:

1. Because the inner and the outer quartz tubes, and the stainless steel tube together form the inner and the outer water passages, it takes more time for water to flow through the ultraviolet ray sterilization device of the present invention, and in turn water will be exposed to ultraviolet ray for longer time, and more thoroughly sterilized in the sterilization device of the present invention.

2. The lamp support and the covering member are threadedly engaged with the upper and the lower ends of the shell, and therefore can be easily separated from the shell for allowing replacement of the internal components of the present invention such as the ultraviolet ray lamp tube, and the inner and the outer quartz tubes. Therefore, the present invention is relatively convenient to use.

What is claimed is:

1. An ultraviolet ray sterilization device, comprising
a shell; the shell having a lamp support joined on an upper end thereof;
an ultraviolet ray lamp tube held in the shell and joined on the lamp support;
an inner quartz tube positioned around the ultraviolet ray lamp tube in the shell; the inner quartz tube being in contact with a bottom side of the lamp support at an upper end thereof;
an outer quartz tube positioned around the inner quartz tube in the shell; an inner water passage being formed between the inner and the outer quartz tubes;
a stainless steel tube positioned around the outer quartz tube in the shell; an outer water passage being formed between the outer quartz tube and the stainless steel tube;
a spiral guiding member secured on the lower end of the shell; the spiral guiding member having a plurality of guiding holes to guide water along a spiral path; the spiral guiding member having a water inlet on a lower portion thereof, which communicates with the guiding holes; the outer quartz tube being fixedly positioned around a circumference of the spiral guiding member at a lower portion thereof;
a covering member positioned around and threadedly engaged with an outer side of the lower end of the shell; the covering member having a through hole on a lower portion thereof; the water inlet of the spiral guiding member extending through the through hole of the covering member; the covering member having a water outlet hole on a lateral side of the lower portion thereof; and
a base joined on the lower portion of the covering member; the base having a water inlet hole communicating with the water inlet of the spiral guiding member; the base having a water outlet hole communicating with the water outlet hole of the covering member.

2. The ultraviolet ray sterilization device as claimed in claim 1, wherein the ultraviolet ray lamp tube is double-barreled.

3. The ultraviolet ray sterilization device as claimed in claim 1 further having an upper fixing member joined on a bottom side of the lamp support; the outer quartz tube being fixedly positioned around the upper fixing member at an upper portion thereof.

4. The ultraviolet ray sterilization device as claimed in claim 1 further having a lower fixing member joined on a lower end of the shell; the inner quartz tube being fixed on the lower fixing member at a lower end thereof.

* * * * *